Feb. 17, 1931.   W. J. MARTIN   1,793,288
TRACK AND ROAD BUS
Filed July 26, 1930
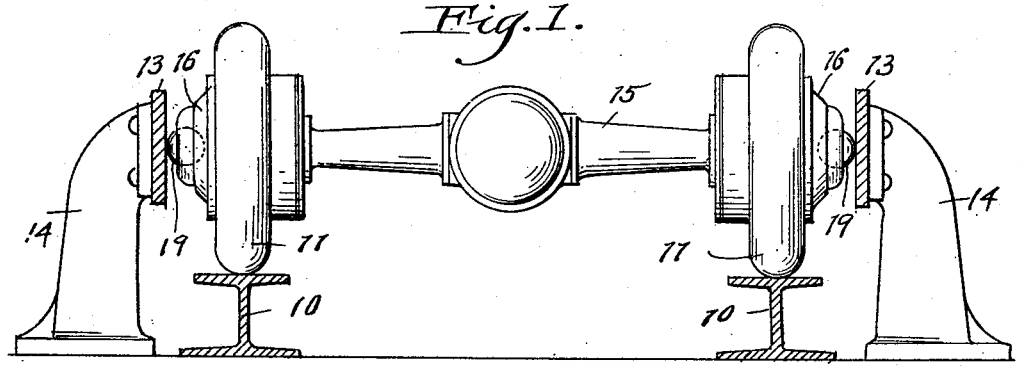
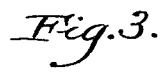
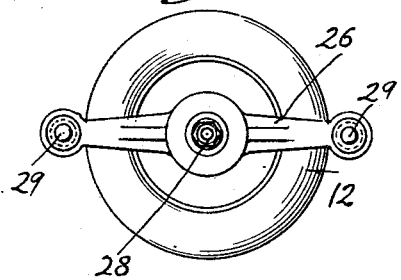
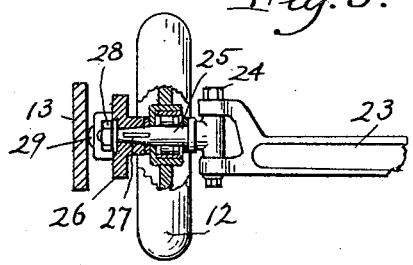
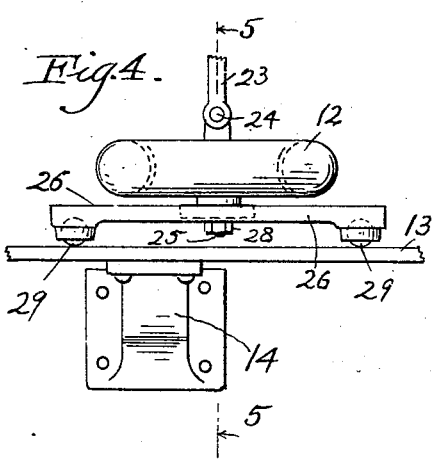
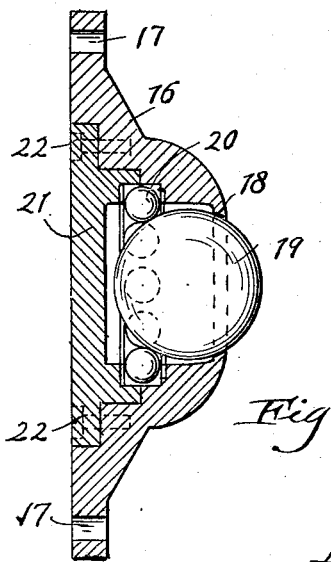

Patented Feb. 17, 1931

1,793,288

UNITED STATES PATENT OFFICE

WILLIAM J. MARTIN, OF CLEVELAND, OHIO

TRACK AND ROAD BUS

Application filed July 26, 1930. Serial No. 470,912.

This invention relates to improvements in track and road busses, that is busses adapted to run either upon a track or upon the road.

One of the objects of the invention is the provision of a bus of this character adapted to run from the road onto a track or from the track onto the road without stopping and without any adjustments whatever.

Another object is the provision of means carried by the wheels of the rear axle for contact with a side rail on either side of the vehicle in order to maintain the wheels of that axle in a predetermined course, such as upon the supporting rails of a track.

Another object is the provision of means carried by the spindles of the forward, dirigible wheels for guiding the wheels along the track rails, and thereby steering the vehicle, as well as for preventing the front wheels from moving laterally upon the rails.

Other objects and features of novelty will appear as I proceed with the description of that embodiment of the invention which, for the purposes of the present application, I have illustrated in the accompanying drawing, in which Figure 1 is a rear view of the rear axle of a vehicle embodying the invention, the side or guard rails and the supporting rails of the track being shown in cross section.

Fig. 2 is a central transverse section on a larger scale through a guard unit adapted to be attached to a rear wheel of the vehicle.

Fig. 3 is a side elevational view of a vehicle front wheel carrying means for guiding the vehicle from a track side rail.

Fig. 4 is a plan view of the same shown in operative relation with a fragment of a side rail, and Fig. 5 is a rear view of one end of a front axle with its associated parts, some of the parts being broken away and others shown in section substantially upon the line 5—5 of Fig. 4.

Owing to the heavy traffic in congested districts, the running time of passenger busses in entering and leaving cities is considerably prolonged and the difficulty of maintaining accurate schedules is increased. Consequently, some little attention has been given to the provision of elevated or other tracks for the exclusive use of bus lines in such congested districts. My invention has to do with means carried by the bus for holding it against lateral movement upon the tracks and for guiding the forward wheels so as to cause them to follow the lines of the track, whether it be straight or curved, and without operation of the usual steering gear by the bus driver. In accordance with my invention, furthermore, the means referred to is such that it is always in readiness for the travel of the bus over a section of track, while as soon as the bus leaves a track and passes onto an ordinary roadway, its travel can be continued without interruption, the usual steering gear then coming into play.

In the drawing, I have indicated at 10 metal track rails having upper flanges of sufficient width to provide satisfactory support for the rear wheels 11 and front wheels 12 of a bus. On account of the use of pneumatic tires, a bus may travel over such a track, even though it be an elevated track, with a minimum of noise, thereby eliminating one of the chief objections to elevated railways. Along either side of the track I provide side rails or guard rails 13 supported at intervals by standards 14, these rails being preferably flat and substantially perpendicular upon their inner sides and being mounted at a height above the top surface of rails 10 substantially equal to the radius of the wheels 11 and 12.

The rear axle 15 of the bus carries near each end bearings (not shown) upon which are mounted the wheels 11, 11, these bearings being fixedly mounted in the usual manner. On the outer side of each wheel 11 I secure a guard unit which may take the form illustrated in Fig. 2, wherein there is an outer circular member 16 provided with openings 17 for the reception of fastenings by means of which the unit is centrally attached to the outer side of the wheel. This member 16 has a central opening therethrough with a constricted rim 18 for the retention of a relatively large steel ball 19. On the inner side of the member 16 I form an annular socket in which I mount a ball race 20, the balls of which are adapted to engage the large ball 19 and take the lateral thrust imparted to that ball during the operation of the bus. To the inner side of the member 16 I attach a retaining plate 21 that is also recessed to receive the ball race 20, and that is provided with a flange for the reception of studs 22 by means of which the two members 16 and 21 are secured together. After the unit has been thus assembled, it may be secured to a wheel 11, thereby bringing the center of ball 19 into alignment with the axis of rotation of the wheel. The balls 19 protrude far enough to engage the rails 13 with but a slight clearance. At all times during the travel of the bus when these balls are in engagement with the rails they of course tend to rotate in a horizontal plane, while the balls of ball race 20 tend to rotate in a vertical plane, but as there is a point to point contact in each instance, and as all of the balls are free to rotate in any direction, friction is reduced to a minimum.

Now referring to the construction at the forward end of the vehicle, a front axle of conventional design is indicated at 23, having on either end a steering knuckle 24 carrying a wheel spindle 25 upon which the wheel 12 is rotatably mounted in the usual manner. The spindle 25 however protrudes beyond the hub of the wheel a distance somewhat greater than is ordinarily the case, and upon such protruding end I mount a longitudinally extending bar 26 which is maintained in fixed relation with the spindle by keys 27 or other suitable means. A nut 28, threaded upon the extremity of the spindle, serves to hold the bar 26 in position. The bar is attached to the spindle preferably at an intermediate point, and at its ends it carries runners 29 adapted to contact with the inner surface of rail 13. For these runners 29 I may employ balls similar to the balls 19, as disclosed in the drawing, although this is not essential since the runner rotates in a horizontal plane exclusively. It will be understood of course that the runners 29, like the balls 19, are so positioned as to contact with the side rails 13 on either side of the vehicle with but a small clearance.

The mountings for the runners 29 may be slightly resilient, so as to enable these runners the more readily to accommodate themselves to curves in the guide rails. However, the slight clearance, previously mentioned, between the runners and the rails will be found ordinarily to be sufficient to compensate for track curvature, inasmuch as the distance between runners on either side of the vehicle will be quite short as compared to the radius of curvature of the track.

While I prefer to employ two guard rails 13, one on either side of the track, I desire to call attention to the fact that the devices disclosed herein are capable of being employed in connection with a single guard rail only, any suitable means for contact with the outer side of the same rail being employed in connection with the ball 19 and the runners 29. Furthermore, it will be observed that a single bar 26 on one of the spindles 25 will serve to manipulate the steering apparatus of the vehicle, because of the contact of the bar with the guard rail on both sides of the spindle and because of the connection of the two forward wheels through the usual drag link construction.

The guard rails 13 will, of course, be flared apart somewhat at each end of any given track in order that the driver of a bus may guide the same readily into position upon the track between the guard rails. As soon as the front axle of a bus has traveled into position beyond the flared ends of the guard rails the operator of the bus is no longer called upon to operate the steering mechanism. When the bus leaves the track the driver must again resume the guidance of the bus by the usual steering mechanism. The parts 19 and 29 remain always in operative position and no adjustment of them is required.

While, in the foregoing description and in the accompanying drawing, I have disclosed more or less in detail one particular embodiment of the invention, I desire it to be understood that such detail disclosure has been resorted to primarily for the purpose of fully illustrating the invention in accordance with the requirements of the statute, and that it is not to be construed as amounting to any limitation upon the scope of the invention.

Having thus described my invention, I claim:

1. In a vehicle having dirigible wheels at one end thereof, spindles upon which said wheels rotate, longitudinally extending arms fixed to said spindles on the outer sides of said wheels, and runners on the extremities of said arms adapted to contact with track side rails for directing the dirigible wheels in a predetermined course.

2. In a vehicle having dirigible wheels at one end thereof, spindles upon which said wheels rotate, a longitudinally extending arm fixed at an intermediate point to one of said spindles on the outer side of the wheel, and runners at both ends of said arm adapted to contact with a track side rail for directing the dirigible wheels in a predetermined course.

3. In a vehicle, steering gear comprising swinging spindles, wheels rotatable thereon, longitudinally extending arms fixed to said spindles on the outer side of said wheels, and runners on the extremities of said arms adapted to contact with track side rails for holding said steering gear to a predetermined course.

4. In a vehicle having dirigible wheels at one end thereof, spindles upon which said wheels rotate, a longitudinally extending arm fixed at an intermediate point to one of said spindles on the outer side of the wheel, runners at both ends of said arm adapted to contact with a track side rail for directing the dirigible wheels in a predetermined course, and means mounted upon the end of the other spindle for contacting with a second track side rail.

5. In a vehicle, an axle, wheel bearings carried thereby near the outer ends thereof, said bearings being maintained in fixed position, wheels rotatable thereon, and a ball mounted in one of said wheels at the center of rotation thereof and projecting outwardly therefrom, said ball being adapted to contact with a track side rail for preventing the wheels from traveling to one side of a predetermined course.

6. In a vehicle, an axle, wheel bearings carried thereby near the outer ends thereof, said bearings being maintained in fixed position, wheels rotatable thereon, a ball mounted in one of said wheels at the center of rotation thereof and projecting outwardly therefrom, said ball being adapted to contact with a track side rail for preventing the wheels from traveling to one side of a predetermined course, and means carried at the opposite side of the vehicle for contact with a second track side rail.

7. In a vehicle, an axle, wheel bearings carried thereby near the outer ends thereof, said bearings being maintained in fixed position, wheels rotatable thereon, a substantially vertical ball race carried by one of said wheels at the center of rotation thereof, a relatively large ball seated laterally against the balls of said race, and means for retaining said large ball in operative relation with said race, said large ball projecting outwardly from the wheel to contact a track side rail for preventing the wheels from traveling to one side of a predetermined course.

8. In a vehicle, front and rear axles, spindles mounted to swing upon said front axle, wheels carried by said rear axle and by said spindles, a longitudinally extending arm fixed at an intermediate point to one of said spindles on the outer side of the wheel, a runner at each end of said arm adapted to contact with a track side rail, means carried by the rear wheel on the same side of the vehicle for engaging said side rail, said runners and said last named means being adapted to properly direct the vehicle in a predetermined course and to prevent its movement laterally to one side of such course, and further side rail engaging means carried by the vehicle for preventing its movement out of said course in the opposite lateral direction.

In testimony whereof, I hereunto affix my signature.

WILLIAM J. MARTIN.